United States Patent
Ravise et al.

(10) Patent No.: US 10,475,432 B2
(45) Date of Patent: Nov. 12, 2019

(54) PROCESS FOR MANUFACTURING AN ACOUSTIC PANEL REINFORCED BY AT LEAST ONE THERMOPLASTIC COMPOSITE LAYER

(71) Applicant: Airbus Operations (S.A.S.), Toulouse (FR)

(72) Inventors: Florian Ravise, Nantes (FR); Hassan Menay, Nantes (FR)

(73) Assignee: Airbus Operations (S.A.S.), Toulouse (FR)

( * ) Notice: Subject to any disclaimer, the term of this patent is extended or adjusted under 35 U.S.C. 154(b) by 106 days.

(21) Appl. No.: 15/721,017

(22) Filed: Sep. 29, 2017

(65) Prior Publication Data

US 2018/0096673 A1 Apr. 5, 2018

(30) Foreign Application Priority Data

Oct. 3, 2016 (FR) ...................... 16 59481

(51) Int. Cl.
*G10K 11/168* (2006.01)
*B32B 5/18* (2006.01)
(Continued)

(52) U.S. Cl.
CPC ........ *G10K 11/168* (2013.01); *B29C 65/1632* (2013.01); *B29C 65/1658* (2013.01);
(Continued)

(58) Field of Classification Search
CPC ............ B29C 66/725; B29C 66/72525; B29C 66/7254; B32B 37/146; B32B 2305/024;
(Continued)

(56) References Cited

U.S. PATENT DOCUMENTS 5,316,604 A * 5/1994 Fell ...................... B29C 65/103
156/82
5,667,881 A 9/1997 Rasmussen et al.
(Continued)

FOREIGN PATENT DOCUMENTS

| DE | 102010007824 A1 | 8/2011 |
|----|-----------------|--------|
| EP | 0400599 A2 | 12/1990 |
| EP | 0747547 A1 | 12/1996 |

OTHER PUBLICATIONS

European Search Report for Application No. 17191861.8 dated Feb. 26, 2018.
(Continued)

*Primary Examiner* — John L Goff, II
(74) *Attorney, Agent, or Firm* — Jenkins, Wilson, Taylor & Hunt, P.A.

(57) ABSTRACT

A process for manufacturing an acoustic panel including at least one acoustically resistive layer, at least one cellular structure and a reflective wall. The process includes steps of depositing the parts of the acoustic panel made of thermosetting composite, depositing a film made of thermoplastic resin that is miscible with the thermosetting composite at the polymerization temperature of the thermosetting composite, polymerizing the parts of the acoustic panel made of thermosetting composite, and depositing and consolidating at least one layer made of thermoplastic composite against the film made of thermoplastic resin in order to form the reflective wall.

7 Claims, 1 Drawing Sheet

(51) Int. Cl.
*B32B 27/06* (2006.01)
*B29D 24/00* (2006.01)
*B32B 27/28* (2006.01)
*B32B 27/30* (2006.01)
*B29C 65/16* (2006.01)
*B29C 65/00* (2006.01)
*B29L 24/00* (2006.01)

(52) U.S. Cl.
CPC .......... *B29C 66/1122* (2013.01); *B29C 66/45* (2013.01); *B29C 66/72525* (2013.01); *B29C 66/7352* (2013.01); *B29C 66/73921* (2013.01); *B29C 66/8362* (2013.01); *B29D 24/002* (2013.01); *B32B 5/18* (2013.01); *B32B 27/06* (2013.01); *B32B 27/281* (2013.01); *B32B 27/285* (2013.01); *B32B 27/304* (2013.01); *B29C 66/71* (2013.01); *B29L 2024/00* (2013.01); *B32B 2305/02* (2013.01); *B32B 2307/10* (2013.01); *B32B 2307/102* (2013.01)

(58) Field of Classification Search
CPC .. G10K 11/168; B29D 24/002; B29D 24/005; B29D 99/001; E04C 2/365; B64C 1/12; B64C 3/26

USPC ............ 156/307.1–307.7, 308.2–309.6, 197; 428/116–118

See application file for complete search history.

(56) References Cited

U.S. PATENT DOCUMENTS

| | | | |
|---|---|---|---|
| 5,888,610 | A | 3/1999 | Fournier et al. |
| 6,372,322 | B1* | 4/2002 | Devaguptapu ............ B32B 3/12 156/197 |
| 2004/0148891 | A1* | 8/2004 | Porte .................... G10K 11/168 52/506.01 |
| 2014/0220356 | A1* | 8/2014 | Van Tooren ............ B29C 65/02 428/413 |

OTHER PUBLICATIONS

French Search Report for French Application No. 1659481 dated Jun. 14, 2017.

* cited by examiner

PROCESS FOR MANUFACTURING AN ACOUSTIC PANEL REINFORCED BY AT LEAST ONE THERMOPLASTIC COMPOSITE LAYER

CROSS-REFERENCE TO RELATED APPLICATION

This patent application claims priority to French patent application FR 16 59481, filed on Oct. 3, 2016, the entire disclosure of which is incorporated by reference herein.

TECHNICAL FIELD

The present application relates to a process for manufacturing an acoustic panel reinforced by at least one thermoplastic composite layer. More particularly, the present application relates in one embodiment to an acoustic panel comprising an acoustically resistive layer, a cellular structure and a reflective wall that are all made of thermosetting composite.

BACKGROUND

For the present application, a composite element comprises fibers embedded in a resin matrix. The resin may be:
- a thermoplastic resin that softens repeatedly when it is heated above a predetermined temperature and which becomes hard again below the predetermined temperature,
- a thermosetting resin which becomes solid irreversibly during a polymerization step.

According to one method of operation, the process for manufacturing an acoustic panel made of thermosetting composite comprises two polymerization steps.

During a first polymerization step, the acoustically resistive layer is produced by optionally incorporating corner pieces in order to form edges of the acoustic panel. During a second polymerization step, the cellular structure reinforced by the reflective layer is incorporated on the acoustically resistive layer.

Carrying out two successive polymerizations may prove difficult to implement, in particular in order to obtain a satisfactory attachment at the interface between the cellular structure and the acoustically resistive layer.

According to another issue, the acoustic panel made of thermosetting composite may be hard to reinforce by affixing to the reflective wall at least one layer made of high-performance thermoplastic composite since the consolidation of the layer requires a temperature rise between 300° C. and 400° C. which is incompatible with the thermosetting composites, and also with the composites that form the cellular structure.

The present disclosure aims to resolve the drawbacks of the prior art.

SUMMARY

It is an object of the disclosure herein to provide a process for manufacturing an acoustic panel comprising at least one acoustically resistive layer, at least one cellular structure and a reflective wall, which process comprises steps of:
- depositing at least one layer configured in order to form the acoustically resistive layer;
- depositing the cellular structure made of thermosetting composite;
- depositing a film made of thermoplastic resin configured in order to be miscible with the thermosetting composite at the polymerization temperature of the thermosetting composite;
- polymerizing the parts of the acoustic panel made of thermosetting composite;
- depositing at least one layer made of thermoplastic composite against the film made of thermoplastic resin, the layer being configured in order to form at least one part of the reflective wall; and
- consolidating the layer and the film made of thermoplastic composite in order to form the reflective wall.

The manufacturing process comprises only one polymerization step which helps to simplify it. According to another aspect, the film made of thermoplastic resin makes it possible to obtain a good attachment between the layer made of thermoplastic composite and the rest of the acoustic panel made of thermosetting composite.

According to another feature, the layer made of thermoplastic composite of the reflective wall is consolidated continuously.

According to another feature, the layer made of thermoplastic composite and the film made of thermoplastic resin are heated locally and concomitantly, just before being brought into contact.

According to another feature, the layer made of thermoplastic composite is pressed against the film made of thermoplastic resin by a roller configured in order to press the layer onto the film.

According to another feature, the layer made of thermoplastic composite is placed under tension before being pressed by the roller.

According to one embodiment, the film is made of polyetherimide or of polyvinylidene fluoride.

According to one embodiment, the reflective wall is made of thermoplastic composite, the film of thermoplastic resin being positioned between the cellular structure and the reflective wall.

Another object of the disclosure herein is to provide an acoustic panel obtained from the process described herein.

BRIEF DESCRIPTION OF THE DRAWINGS

Other features and advantages will emerge from the following description of the disclosure herein, which description is given solely by way of example, with reference to the appended and example drawings in which.

DETAILED DESCRIPTION

Figure 1:
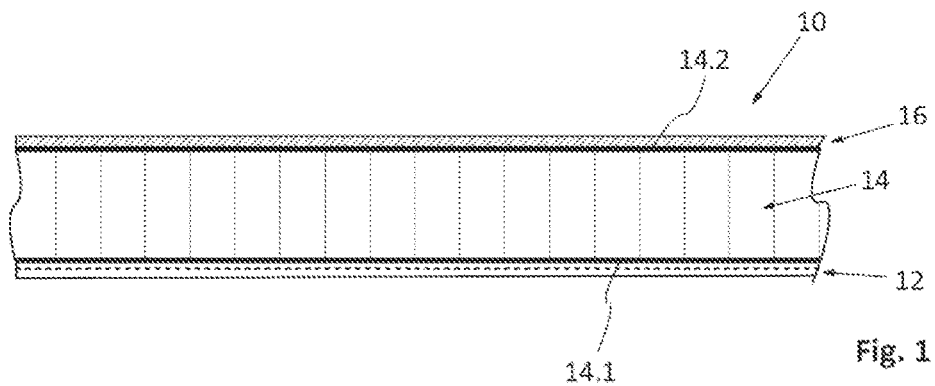
FIG. 1 is a cross section of an acoustic panel that illustrates one embodiment of the disclosure herein.

According to one embodiment illustrated by FIG. 1, an acoustic panel 10 comprises an acoustically resistive layer 12, a cellular structure 14 and a reflective wall 16. A layer is understood to mean one or more intimately bonded layers.

As a variant, the acoustic panel comprises several cellular structures 14 separated by acoustically resistive layers each referred to as a septum.

Each cellular structure 14 comprises a first face 14.1 connected to the acoustically resistive layer 12 and a second face 14.2 connected to the reflective wall 16.

Figure 2A:
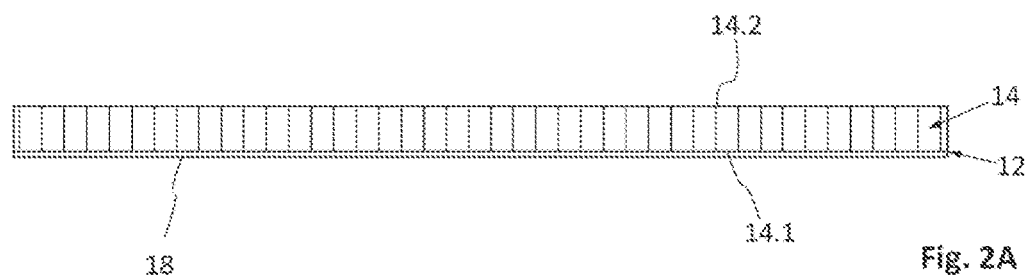
FIGS. 2A through 2C are diagrams that illustrate a process for manufacturing an acoustic panel according to the disclosure herein.
Figure 2B:
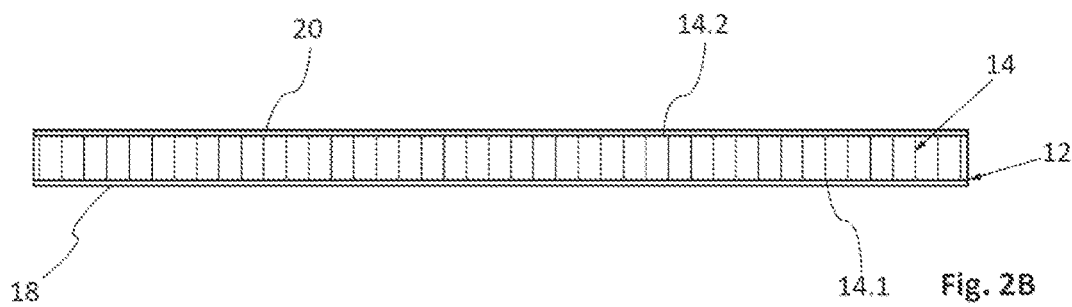
Figure 2C:
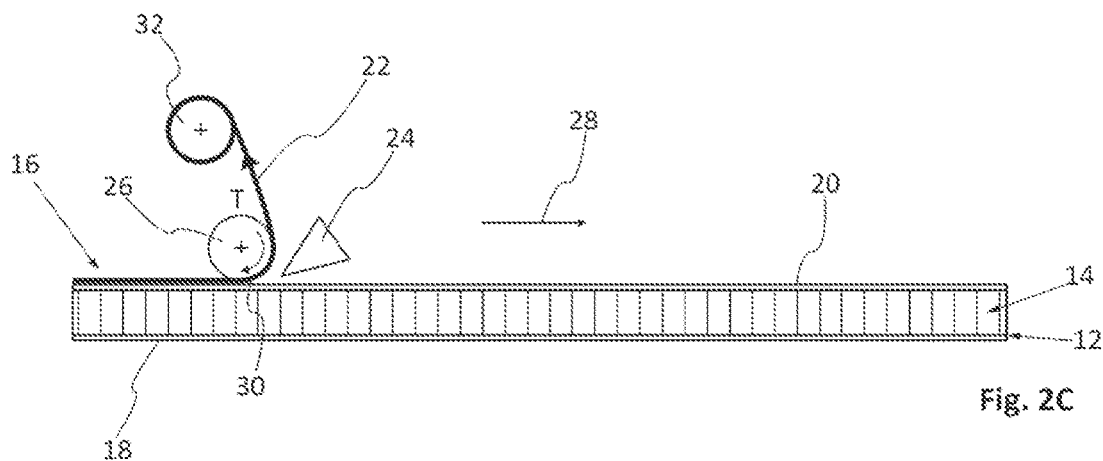

According to a first embodiment, the manufacturing process comprises:

depositing at least one layer 18 made of thermosetting material, or made of metal or other material, configured in order to form the acoustically resistive layer 12;

depositing the cellular structure 14 made of thermosetting material on the layer 18, the first face 14.1 being in contact with the layer 18, as illustrated in FIG. 2A;

depositing a film 20 made of thermoplastic resin configured in order to be miscible with the thermosetting material of the cellular structure at its polymerization temperature, as illustrated in FIG. 2B;

polymerizing the acoustically resistive layer 12 and the cellular structure 14;

depositing at least one layer 22 made of thermoplastic material against the film 20 made of thermoplastic resin; and consolidating the layer 22 and the film 20 made of thermoplastic composite in order to form the reflective wall 16.

According to this first embodiment, the entire reflective wall 16 is made of thermoplastic composite and the film 20 made of thermoplastic resin is positioned between the cellular structure 14 and the reflective wall 16.

According to a second embodiment, the reflective wall 16 comprises at least one layer made of thermosetting composite in contact with the cellular structure 14 and at least one layer 22 made of thermoplastic material.

For this second embodiment, the manufacturing process comprises depositing the layer(s) made of thermosetting composite of the reflective wall 16 against the second face 14.2 of the cellular structure 14 prior to depositing the film 20 made of thermoplastic resin. After depositing the film 20 on the layer(s) made of thermosetting composite of the reflective wall 16, the acoustically resistive layer 12, the cellular structure 14 and the layer(s) made of thermosetting material of the reflective wall 16 are polymerized. After polymerization, the layer(s) 22 made of thermoplastic composite of the reflective wall 16 are deposited against the film 20 and consolidated.

Irrespective of the embodiment, at least one layer 22 of the reflective wall is made of thermoplastic composite and is bonded to the rest of the acoustic panel 10 made of thermosetting composite by a film 20 made of thermoplastic resin.

The layer(s) made of thermosetting composite which form the acoustically resistive layer 12 or a part of the reflective wall 16 are deposited manually or automatically.

The film 20 made of thermoplastic resin is deposited manually or automatically.

By way of indication, the film 20 made of thermoplastic resin has a thickness of between 25 and 100 μm.

The film 20 is made of a thermoplastic material that is miscible with the thermosetting composite at the polymerization temperature of the thermosetting composite. To give an order of magnitude, the polymerization temperature is of the order of from 120° C. to 180° C.

According to an embodiment, the film 20 is made of polyetherimide resin, referred to as PEI resin, or of polyvinylidene fluoride.

The polymerization step is carried out by covering the assembly formed by the acoustically resistive layer 12, the cellular structure 14 and the optional layer of the reflective wall 16 made of thermosetting composite with a bladder, by placing everything in an oven and by subjecting it to a temperature and pressure cycle.

During the polymerization phase, a solid bond is obtained between the film 20 made of thermoplastic resin and the part of the acoustic panel made of thermosetting composite.

Preferably, the layer 22 made of thermoplastic composite of the reflective wall is consolidated continuously.

For this purpose, the layer 22 made of thermoplastic composite and the film 20 made of thermoplastic resin are heated locally, concomitantly, just before being brought into contact. In order to obtain this temperature rise, a mobile heating source 24 is used, such as for example a laser-type heating source.

In order to obtain a consolidation continuously, the layer 22 made of thermoplastic composite is pressed against the film 20 made of thermoplastic resin by a roller 26 configured in order to press the layer 22 onto the film 20.

The mobile heating source 24 and the roller 26 are moved in a synchronized manner along a displacement direction 28. The mobile heating source 24 is positioned in front of the roller 26.

According to a method of operation, the layer 22 made of thermoplastic composite is placed under tension before being pressed by the roller 26 at a contact point 30.

According to one embodiment, the layer 22 made of thermoplastic composite is stored on a reel 32. It is unwound from the reel 32 and then comes into contact with the roller 26 which by rolling onto the layer 22 brings about the unwinding thereof. The reel 32 is equipped with a system for controlling the unwinding of the layer 22 in order to control the tension T of the layer 22.

By the temperature rise generated by the heating source 24, at the pressure exerted by the roller 26 and at the tensioning of the layer 22, a satisfactory degree of crystallinity is attained, making it possible to obtain an in situ consolidation of the layer 22 made of thermoplastic composite. Thus, it is not necessary to bring the whole of the acoustic panel to a high temperature in order to give rise to the consolidation of the layer 22 made of thermoplastic composite that forms, at least in part, the reflective wall While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process for manufacturing an acoustic panel comprising at least one acoustically resistive layer, at least one cellular structure and a reflective wall, the process comprising successive steps of:

depositing at least one layer configured in order to form the acoustically resistive layer;

depositing the cellular structure made of thermosetting composite;

depositing a film made of thermoplastic resin configured to be miscible with the thermosetting composite at a polymerization temperature of the thermosetting composite;

polymerizing the thermosetting composite;

depositing at least one layer made of thermoplastic composite against the film made of thermoplastic resin, the layer being configured to form at least one part of the reflective wall; and consolidating the layer and the film in order to form the reflective wall.

2. The process as claimed in claim 1, wherein the layer made of thermoplastic composite of the reflective wall is consolidated continuously.

3. The process as claimed in claim 2, wherein the layer made of thermoplastic composite and the film made of thermoplastic resin are heated locally and concomitantly, just before being brought into contact.

4. The process as claimed in claim 3, wherein the layer made of thermoplastic composite is pressed against the film made of thermoplastic resin by a roller configured in order to press the layer onto the film.

5. The process as claimed in claim 4, wherein the layer made of thermoplastic composite is placed under tension before being pressed by the roller.

6. The process as claimed in claim 1, wherein the film is made of polyetherimide or of polyvinylidene fluoride.

7. The process as claimed in claim 1, wherein the reflective wall is made of thermoplastic composite, the film of thermoplastic resin being positioned between the cellular structure and the reflective wall.

* * * * *